United States Patent
Nakayama et al.

(10) Patent No.: US 7,150,266 B2
(45) Date of Patent: Dec. 19, 2006

(54) METHOD OF CONTROLLING AIR FUEL RATIO LEARNING FOR DUAL INJECTION INTERNAL COMBUSTION ENGINE IN HYBRID VEHICLE

(75) Inventors: Yusuke Nakayama, Gotemba (JP); Yukihiro Sonoda, Suntou-gun (JP); Koji Morita, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 59 days.

(21) Appl. No.: 11/130,199

(22) Filed: May 17, 2005

(65) Prior Publication Data

US 2005/0257771 A1     Nov. 24, 2005

(30) Foreign Application Priority Data

May 21, 2004  (JP) .............................. 2004-152188

(51) Int. Cl.
   *F02B 7/00*    (2006.01)
   *F02B 7/02*    (2006.01)
(52) U.S. Cl. ...................................... 123/431; 123/674
(58) Field of Classification Search ................ 123/431, 123/179.3, 673, 674, 681; 180/65.1, 65.2, 180/65.3, 65.4, 65.8
See application file for complete search history.

(56) References Cited

U.S. PATENT DOCUMENTS

| | | | |
|---|---|---|---|
| 4,831,992 A | 5/1989 | Jundt et al. | |
| 6,014,962 A * | 1/2000 | Sato et al. | 123/674 |
| 6,340,014 B1 | 1/2002 | Tomita et al. | |
| 6,442,455 B1 * | 8/2002 | Kotre et al. | 701/22 |
| 7,013,873 B1 * | 3/2006 | Oomori | 123/431 |
| 2002/0079149 A1 | 6/2002 | Kotre et al. | |

FOREIGN PATENT DOCUMENTS

| | | |
|---|---|---|
| DE | 36 39946 A1 | 6/1988 |
| DE | 101 62 067 A1 | 10/2002 |
| EP | 0 943 793 A2 | 9/1999 |
| JP | A 3-185242 | 8/1991 |
| JP | A 2000-291471 | 10/2000 |

* cited by examiner

Primary Examiner—Mahmoud Gimie
(74) Attorney, Agent, or Firm—Oliff & Berridge, PLC

(57) ABSTRACT

In a hybrid vehicle driven by a dual injection internal combustion engine including an injector for in-cylinder injection and an injector for in-intake air path injection, and assistive dynamic, to control learning of the internal combustion engine's air fuel ratio learning value to learn the engine's air fuel ratio the engine is steadily operated and only any one of the injectors is allowed to inject fuel, while learning of the air fuel ratio is controlled, and after controlling the learning has completed the other injector is alone allowed to inject the fuel, while learning of air fuel ratio is controlled.

2 Claims, 5 Drawing Sheets

F I G. 4
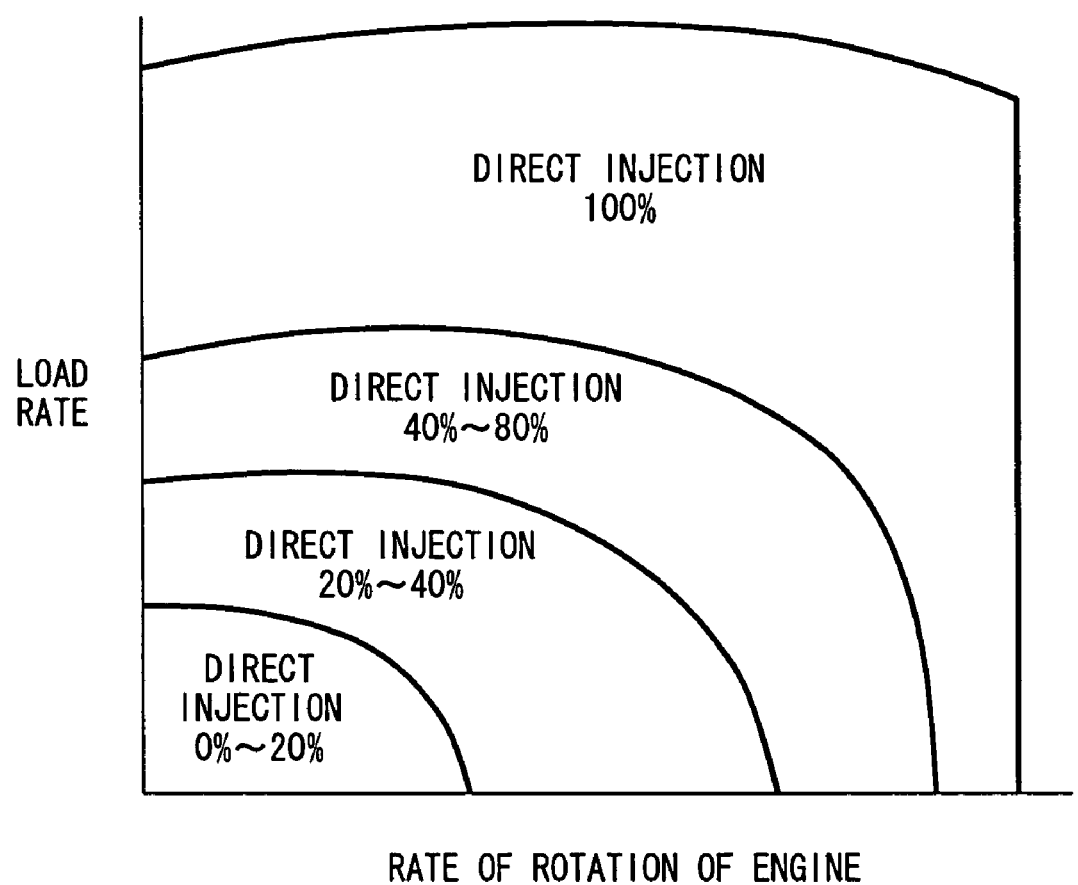

METHOD OF CONTROLLING AIR FUEL RATIO LEARNING FOR DUAL INJECTION INTERNAL COMBUSTION ENGINE IN HYBRID VEHICLE

This nonprovisional application is based on Japanese Patent Application No. 2004-152188 filed with the Japan Patent Office on May 21, 2004, the entire contents of which are hereby incorporated by reference.

BACKGROUND OF THE INVENTION

1. Field of the Invention

The present invention relates generally to methods of controlling air fuel ratio learning for dual injection internal combustion engines in hybrid vehicles, and particularly to those for dual injection internal combustion engines including an injector injecting fuel into a cylinder for in-cylinder injection and an injector injecting fuel into an intake manifold or port for in-intake air path injection, and dual injection internal combustion engines mounted on hybrid vehicles and driven by assistive dynamic.

2. Description of the Background Art

A known hybrid vehicle is driven by an internal combustion engine and an electric motor or similar assistive dynamic.

Furthermore, a so-called dual injection internal combustion engine is also known. More specifically, it includes an injector injecting fuel into a cylinder for in-cylinder injection and an injector injecting fuel into an intake manifold or port for in-intake air path injection and in accordance with the engine's running condition the injectors are switched for example to achieve stratified combustion for a low load driving range and homogenous combustion for a high load driving range and in accordance with a driving condition a predetermined share ratio is applied to inject the fuel for example to achieve improved fuel efficiency and output characteristics.

Furthermore, an internal combustion engine has its output, exhaust and other characteristics and, furthermore, its drivability and other similar variety of performance corrected by controlling an air fuel ratio of an air fuel mixture supplied to the engine by correcting the ratio through feedback to be a target air fuel ratio matching a driving condition of interest. To provide the control through feedback for correction with increased precision, learning of an air fuel ratio learning value, or air fuel ratio learning, is controlled and this value is reflected in the control through feedback for correction.

If an air fuel ratio is collected through feedback and thus controlled and air fuel ratio learning is controlled, as described above, in an internal combustion engine mounted in a hybrid vehicle, a problem arises: a type of hybrid vehicle has its internal combustion engine stopped depending on the vehicle's running condition, when air fuel ratio learning will not be controlled. As a result, the air fuel ratio learning control is not completed at an early stage as expected and accurate air fuel ratio feedback correction control may not be exerted. Japanese Patent Laying-Open No. 2000-291471 addresses such disadvantage. More specifically, an air fuel ratio learning value is learned in a learning area divided into a plurality of subareas corresponding to driving conditions and for at least one subarea the value is learned in a vicinity of the center of the subarea, and to do so a ratio of requested output to an internal combustion engine and assistive dynamics is determined and feedback operation is also compulsorily performed to complete the air fuel ratio learning control at an early stage.

The technique described in Japanese Patent Laying-Open No. 2000-291471 is, however, associated with an internal combustion engine including only a single injector, and does not allow for a dual injection internal combustion engine including an injector injecting fuel into a cylinder for in-cylinder injection and that injecting fuel into an intake manifold or port for in-intake air path injection. If air fuel ratio learning control is completed at an early stage for only one injector, i.e., the control is not completed for both injectors, it is difficult to learn which injector injects an amount of fuel contributing to air fuel ratio variation. Thus for dual injection internal combustion engine there is a demand for early and in addition accurately controlling air fuel ratio learning for each of both injectors.

SUMMARY OF THE INVENTION

Accordingly the present invention contemplates a method of controlling learning of an air fuel ratio early and accurately for each of both injectors in a dual injection internal combustion engine in a hybrid vehicle.

The above object is achieved by the method of controlling learning of an air fuel ratio of a dual injection internal combustion engine in a hybrid vehicle in one embodiment of the present invention, characterized in that in a hybrid vehicle driven by a dual injection internal combustion engine including an injector for in-cylinder injection and an injector for in-intake air path injection, and assistive dynamic, to control learning of the internal combustion engine's air fuel ratio learning value to learn the engine's air fuel ratio the engine is steadily operated and only any one of the injectors is allowed to inject fuel, while learning of the air fuel ratio is controlled, and after controlling the learning has completed the other injector is alone allowed to inject the fuel, while learning of air fuel ratio is controlled.

After controlling learning of the air fuel ratio has completed for both of the injectors said injectors may both be permitted to inject the fuel for dual injection.

In accordance with the present method, to control learning of the internal combustion engine's air fuel ratio learning value to learn the engine's air fuel ratio the engine is steadily operated and only any one of the injectors is allowed to inject fuel, while learning of the air fuel ratio is controlled, and after controlling the learning has completed the other injector is alone allowed to inject the fuel, while learning of air fuel ratio is controlled. As air fuel ratio learning is controlled with the engine in a steady operation state, the fuel can be injected in an amount without variation and the learning can be controlled accurately and rapidly. Furthermore, air fuel ratio learning can be controlled for any one of the injectors for in-cylinder injection and in-intake air path injection, respectively, one at a time. Thus, air fuel ratio learning can be controlled for each of both injectors early and accurately.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a graph representing one example of a fuel injection share ratio of the dual injection internal combustion engine with the present invention applied thereto.

DESCRIPTION OF THE PREFERRED EMBODIMENTS

Figure 1:
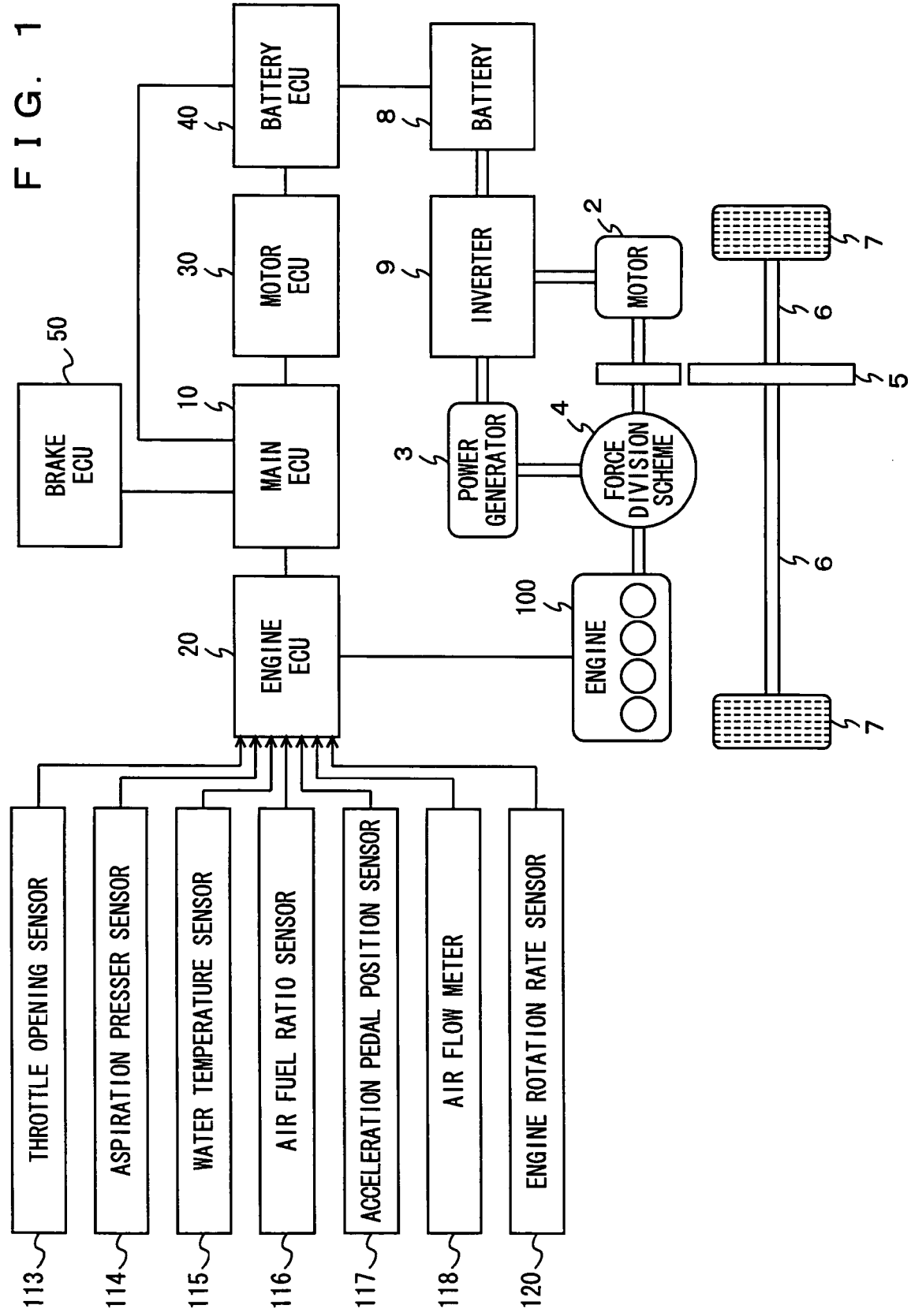
FIG. 1 is a block diagram schematically showing an arrangement of a hybrid vehicle with the present invention applied thereto.

Initially, the present invention is applied to a hybrid vehicle having an arrangement, as schematically shown in FIG. 1.

The FIG. 1 hybrid vehicle is driven by a source implemented by an internal combustion engine 100 and assistive dynamic or a motor 2. The hybrid vehicle also has a power generator 3 receiving an output from engine 100 to generate power. Engine 100, motor 2 and power generator 3 are interconnected by force division scheme 4 implemented for example by a planetary gear system and serving for example to distribute the engine 100 output to power generator 3, a drive wheel 7 and the like and receive an output from motor 2 for transmission to wheel 7 as well as serving as a transmission for a driving force transmitted to wheel 7 via a differential gear 5 and a drive shaft 6.

Motor 2 is for example an alternate-current (ac) synchronous motor driven by ac power. An inverter 9 converts power stored in battery 8 from a direct current to an alternate current and supplies it to motor 2, and also converts power generated by power generator 3 from an alternate current to a direct current. The power converted to the direct current is stored to battery 8. Power generator 3 basically also has an arrangement substantially equivalent to motor 2 described above, and has a function serving as an ac synchronous motor. While motor 2 mainly operates to output driving force, power generator 3 mainly operates to receive the engine 100 output to generate power.

Note that while motor 2 mainly operates to generate the driving force, motor 2 can also utilize rotation of wheel 7 to generate power generatively. When the motor regeneratively generates power, drive wheel 7 is regeneratively braked, and by utilizing this together with stepping on the foot brake or exerting engine brake, the hybrid vehicle can be braked. In contrast, while power generator 3 mainly operates to receive the engine 100 output to generate power, power generator 3 can also receive power from battery 8 via inverter 9 to function as a motor.

Figure 2:
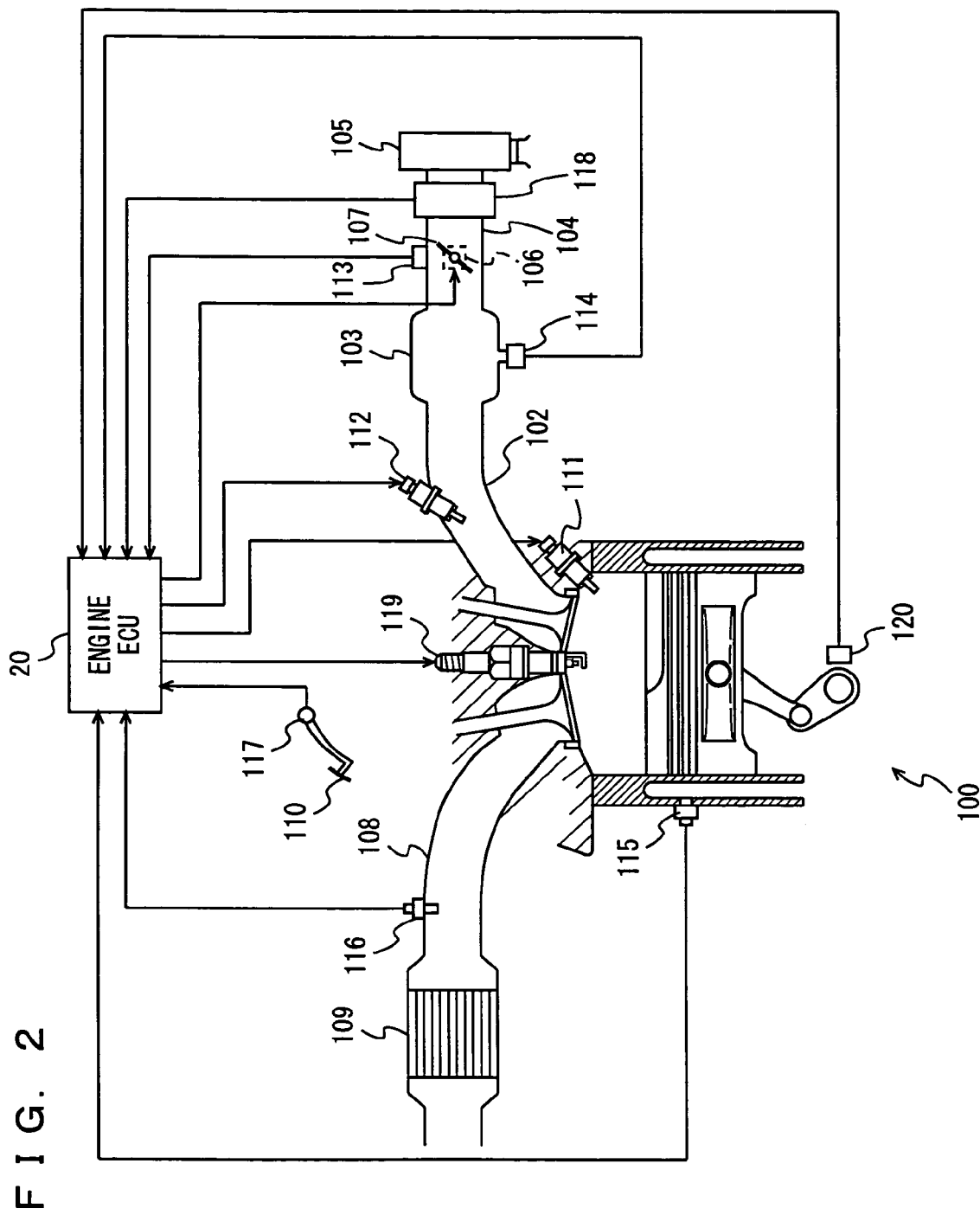
FIG. 2 is a schematic diagram in cross section schematically showing an arrangement of a dual injection internal combustion engine with the present invention applied thereto.

The present invention is applied to a dual injection internal combustion engine 100 as will now be described with reference to FIG. 2. Engine 100 includes a plurality of cylinders each connected via a corresponding intake manifold 102 to a common surge tank 103 connected to an air cleaner 105 via an intake air duct 104 having arranged therein an air flow meter 118 and a throttle valve 107 driven by a step motor 106 and controlled to open and close intake air duct 104 substantially in synchronization with stepping on an accelerator pedal 110. The cylinders are also connected to a common exhaust manifold 108 connected to a ternary catalyst converter 109. The combustion chamber has a top portion provided with a spark plug 119.

Each cylinder is provided with an injector 111 injecting fuel into the cylinder for in-cylinder injection and an injector 112 injecting fuel into an intake air port or manifold for in-intake air path injection. Injector 111, 112 is controlled by a signal output from an engine electronic control unit (hereinafter referred to as "engine ECU") 20 described hereinafter. Injector 111 for injection into each cylinder is connected to a common fuel distribution pipe (not shown) connected to an engine-driven, high pressure fuel pump via a check valve allowing communication toward the pipe.

Injector 112 for injection into each intake manifold is also connected to common fuel distribution pipe (not shown), and the fuel distribution pipe and high pressure fuel pump are connected via a common fuel pressure regulator to an electric motor driven, low pressure fuel pump connected via a fuel filter to a fuel tank. When the low pressure fuel pump pumps out fuel having a pressure higher than a predetermined set fuel pressure, the fuel pressure regulator returns to the fuel tank a portion of the fuel pumped out from the low pressure fuel pump. Thus injector 112 for in-intake air path injection and the high pressure fuel pump receive fuel having a pressure prevented from being higher than the set fuel pressure.

When the thus configured hybrid vehicle for example drives off or runs under light load, motor 2, capable of generating high torque at a low rate of rotation, can be utilized, i.e., motor 2 is alone driven by power provided from battery 8 to cause a driving force to run the hybrid vehicle. When the vehicle attains a level of speed and also runs under increased load, then engine 100 is driven, and the driving force of engine 100 and that of motor 2 driven by power generated by power generator 3 by the output of engine 100 run the hybrid vehicle. Furthermore, if the vehicle is accelerated on full throttle or further output is required, motor 2 is driven by both of power from power generator 3 and that from battery 8 and the drive force of engine 100 is also increased so that the drive force of engine 100 and that of motor 2 are both used to run the hybrid vehicle. When the vehicle is decelerated, braked or the like, the force of rotation of drive wheel 7 is utilized to allow motor 2 to regeneratively generate power to regeneratively brake the hybrid vehicle. Furthermore, if battery 8 decreases in availability, then engine 100 is driven even if the vehicle runs under a light load, and the output of engine 100 can be utilized to allow power generator 3 to generate power and charge battery 8 via inverter 9.

Reference is again made to FIG. 1 to describe some electronic control units (ECUs) controlling a hybrid vehicle, as described above. Driving by engine 100 and electrical driving by motor 2 (and power generator 3) characteristic to a hybrid vehicle are generally controlled by a main ECU 10. For a normal driving condition, main ECU 10 determines a distribution of output to engine 100 and motor 2 to achieve optimum energy efficiency, and to control engine 100, motor 2 and power generator 3 in accordance with the requested output distribution, each control command is output to an engine ECU 20 and a motor ECU 30.

Engine and motor ECUs 20 and 30 also transmit information of engine 100, motor 2 and power generator 3 to main ECU 10. To main ECU 10 are also connected a battery ECU 40 controlling battery 8, a brake ECU 50 controlling a brake, and the like. Battery ECU 40 monitors battery 8 in availability and if the battery is insufficient in availability, battery ECU 40 outputs a command to main ECU 10 to request it to charge the battery. ECU 10 having received the request controls power generator 3 to generate power to charge battery 8. Brake ECU 50 controls braking the hybrid vehicle and cooperates with main ECU 10 to control generative braking by motor 2.

These ECUs are implemented by digital computer and include a read only memory (ROM), a random access memory (RAM), a CPU (or a microprocessor), input and output ports and the like interconnected by a bidirectional bus. To engine ECU 20 a variety of sensors are connected, as described follows: a throttle opening sensor 113 generating an output voltage proportional to a degree of opening of throttle valve 106; an aspiration pressure sensor 113 attached to surge tank 103 and generating an output voltage proportional to aspiration pressure; a water temperature sensor 115 attached to an engine block and generating an output voltage proportional to temperature of water that cools the engine; and an air fuel ratio sensor 116 attached to an exhaust manifold 108 upstream of catalyst 109; an acceleration pedal position sensor 117 connected to accelerator pedal 110 and generating an output voltage proportional to an amount of stepping on the pedal; and air flow meter 118 generating an output voltage proportional to an amount of intake air are each connected via an AD converter (not shown) to engine ECU 20 at an input port having a rotation rate sensor 120 connected thereto to generate an output pulse representing a rate of rotation of the engine.

In the present embodiment, air fuel ratio sensor 116 is an $O_2$ sensor and provides an output varying with the concentration of oxygen contained in exhaust gas, and from the output from air fuel ratio sensor 116, whether engine 100 combusts an air fuel mixture having an air fuel ratio rich or lean relative to a theoretical air fuel ratio, can be detected in on-off manner. Air fuel ratio sensor 116 may be implemented by a full range air fuel ratio sensor (a linear air fuel ratio sensor) generating an output voltage proportional to the air fuel ratio of the air fuel mixture combusted in engine 100. In engine ECU 20's ROM, an amount of fuel injected (or a time for injection of the fuel) numerically represented, a share ratio and the like that are set to correspond to the engine's driving condition, as based on the engine's load rate and rate of rotation obtained from acceleration pedal position sensor 117, air flow meter 118 and rotation rate sensor 120, and a correction value based on the temperature of the water that cools the engine, and the like are previously mapped and thus stored.

The thus configured hybrid vehicle uses engine 100 and motor 2 together as its driving source. As such, if the vehicle requires a level of driving force, the ratio between the output of engine 100 and that of motor 2 can be changed so that they can be changed without changing a total output required by the vehicle. More specifically, when the vehicle requires a level of driving force, increasing the output of motor 2 can accordingly reduce that of engine 100, and reducing the output of motor 2 can accordingly increase that of engine 100. The present embodiment provides a method of controlling air fuel ratio learning that utilizes such feature.

Reference will now be made to the FIG. 3 flow chart to describe one embodiment of a method of controlling air fuel ratio learning that is employed to learn an air fuel ratio learning value of engine 100 configured as described above. This control is exerted for example immediately after engine 100 is started in a predetermined period while the hybrid vehicle is running after it is started to drive off by the driving force of motor 2.

Initially when the procedure is started it proceeds with step S301 to determine whether engine 100 is capable of steady operation. This decision can be made for example by whether battery ECU 40 informs that battery 8 is sufficient in availability and motor 2 is capable of run the vehicle. Preferably, a decision that the engine is incapable of steady operation is made when acceleration pedal position sensor 117, water temperature sensor 115 and the like signal that a load required for engine 100 exceeds a predetermined value and the water that cools engine 100 has a temperature having a value equal to or smaller than a predetermined value, since such cannot ensure engine 100's steady operation. Thus when a decision is made that the engine is incapable of steady operation this routine is temporarily terminated.

If at step S301 a decision is made that the engine is capable of steady operation, the procedure proceeds with step S302 to set engine 100 in a steady operation state, which refers to a state in which engine 100 for example has a throttle valve 107 opened at a degree controlled to be constant as based on a signal output from acceleration pedal position sensor 113 and the fuel is also injected in an amount controlled to be constant so that a load rate and a rate of rotation do not vary, i.e., it is not transitionally operated. Note that more than one steady operation state may be set for different operation ranges. For each range, air fuel ratio learning can be controlled with increased precision.

For engine 100 in the present embodiment, injector 111 for in-cylinder injection and injector 112 for in-intake air path injection inject fuel at a ratio determined in accordance with an operation range or condition for example as shown in FIG. 4. More specifically, in FIG. 4, "direct injection 100%" indicates a range (X=100) for which injector 111 for in-cylinder injection alone injects fuel. "Direct injection 0–20%" indicates a range (X=0 to 20) for which injector 111 for in-cylinder injection is responsible for 0–20% of injection. For example, for a range of "direct injection 40%", injector 111 for in-cylinder injection is responsible for 40% of injection and injector 112 for in-intake air path injection is responsible for 60% of injection so that their share rate will be 40:60.

With reference again to the FIG. 3 flow chart at step S302 engine 100 is set in the steady operation state and thereafter at step S303 a total amount of fuel injected as controlled to be constant, as described above, is injected only through injector 111 for in-cylinder injection, i.e., operation with "direct injection 100%" is effected, and at step S304, air fuel ratio learning including learning a characteristic of injector 111 for in-cylinder injection, a characteristic of the air flow meter, and the like is controlled, as will be described later. Furthermore the procedure proceeds with step S305 to determine whether the air fuel ratio learning control completes, and if not the procedure returns to step S304 to continue the air fuel ratio learning control. Whether the air fuel ratio learning control has completed or not is determined, as will be described later more specifically.

When the air fuel ratio learning control completes for injector 111 for in-cylinder injection, the procedure proceeds with step S306 and a total amount of fuel injected as controlled to the constant, as described above, is injected only through injector 112 for in-intake air path injection, i.e., operation with "direct injection 0%" or "port injection 100%" is effected, and at step S307, air fuel ratio learning including learning a characteristic of injector 112 for in-intake air path injection and the like is controlled. Furthermore the procedure proceeds with step S308 to determine whether the air fuel ratio learning control has completed and if not then the procedure returns to step S307 to continue to the control. Note that if engine 100 is in the steady operation state and air fuel ratio learning is simultaneously controlled, and the hybrid vehicle simultaneously requests a further output, then main ECU 10 can issue each control command to engine ECU 20 and motor ECU 30 to maintain the engine 100 output constant while providing the motor 2 output at an increased ratio, as has been previously described.

Figure 5:
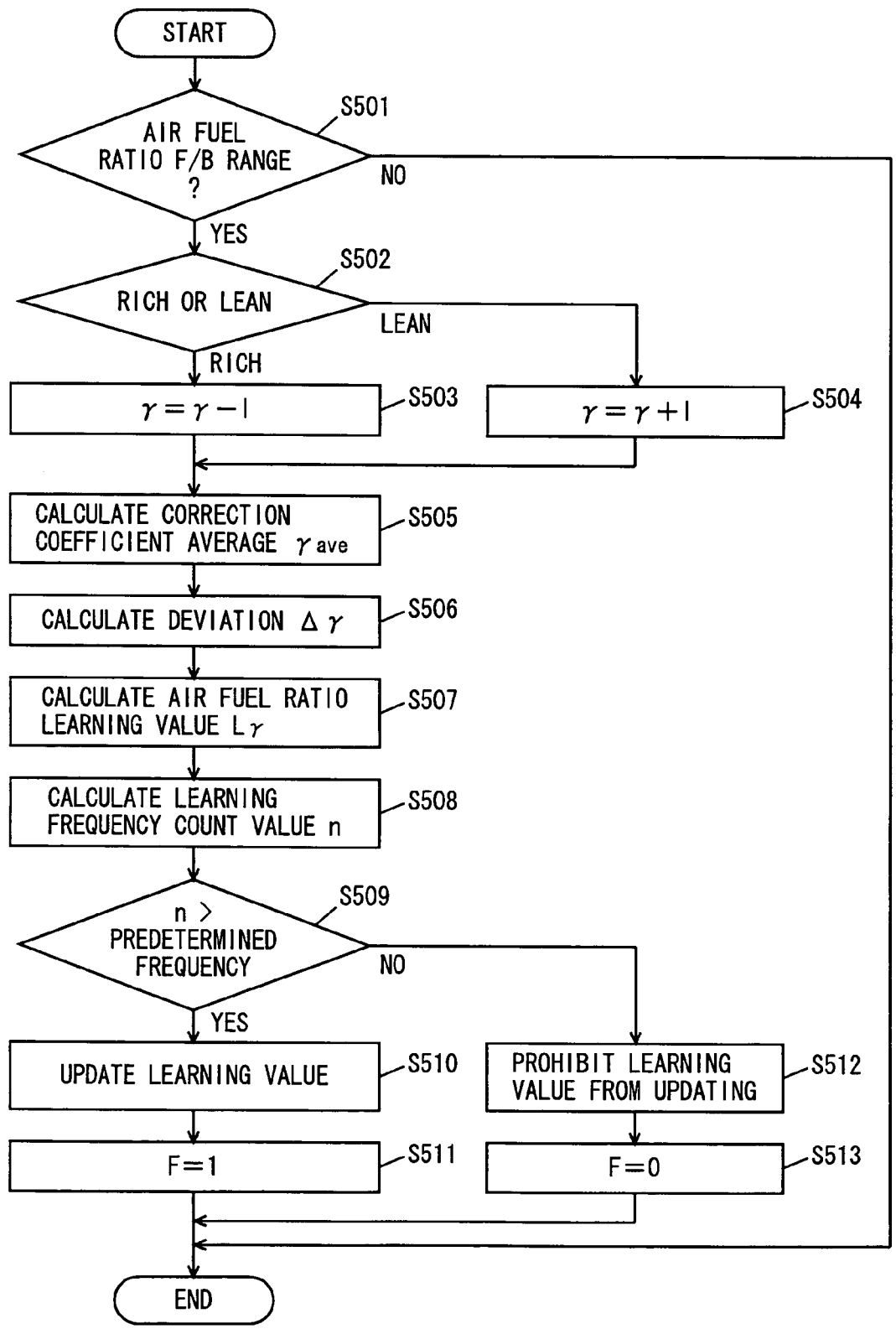
FIG. 5 is a flow chart representing one example of a routine in an embodiment of the present invention for controlling air fuel ratio learning.

Whether air fuel ratio learning including learning the characteristic of injector 111 for in-cylinder injection or injector 112 for in-intake air path injection has been controlled is determined as based on a routine for controlling air fuel ratio feedback and air fuel ratio learning, as will be described with reference to the FIG. 5 flow chart. The FIG. 5 routine is executed for each predetermined time (or rotation). Initially at step S501 a decision is made as to whether a range of interest is a predetermined air fuel ratio feedback control range. More specifically, the decision is made for example from that it corresponds to homogenous stoichiometric combustion and is not a full throttle range. If it is not the air fuel ratio feedback range, the present routine ends, (when an air fuel ratio feedback correction coefficient γ is held at the previous value,) and only when it is established the procedure proceeds with step S502 et seq.

Herein, air fuel ratio feedback correction coefficient γ is applied to an air fuel ratio detected by air fuel ratio sensor 116 from an oxygen content of exhaust gas to correct the detected air fuel ratio through feedback to achieve a target air fuel ratio. For example, if an air fuel ratio is corrected to achieve a theoretical air fuel ratio, and air fuel ratio sensor 116 detects the air fuel ratio richer than the theoretical air fuel ratio, air fuel ratio feedback correction coefficient γ is provided with a value gradually reducing an amount of fuel injected and when air fuel ratio sensor 116 detects an air fuel ratio transitioning from rich to lean, a value increasing the amount of fuel injected is applied in a skipping manner as improvement in responsiveness is considered.

In contrast, while air fuel ratio sensor 116 detects an air fuel ratio leaner than the theoretical air fuel ratio, air fuel ratio feedback correction coefficient γ is provided with a value gradually increasing the amount of fuel injected and when air fuel ratio sensor 116 detects that the air fuel ratio transitions from lean to rich a value decreasing the amount of fuel injected is applied in a skipping manner as improvement in responsiveness is considered. Air fuel feedback correction coefficient γ is thus generated to constantly maintain an air fuel ratio at the theoretical air fuel ratio.

Accordingly at step S502 whether an air fuel ratio is rich or lean is determined from an output of air fuel ratio sensor 116. If the air fuel ratio is rich then the procedure proceeds with step S503 to decrease air fuel ratio feedback correction coefficient γ relative to the previous value by a prescribed integration I. In contrast, if the air fuel ratio is lean then the procedure proceeds with step S504 to increase air fuel ratio feedback correction coefficient γ relative to the previous value by predetermined integration I. Note that at rich-lean inversion, air fuel ratio feedback correction coefficient γ is increased/decreased relative to the previous value by a prescribed proportion P (>>I), although not shown to simplify the description.

Then at step S505 air fuel ratio feedback correction coefficient γ's average value γave is calculated. More specifically, for example, average value $\gamma = (\gamma 1 + \gamma 2)/2$ from a latest stored value γ1 of air fuel ratio feedback correction coefficient at rich→lean inversion and a latest stored value γ2 of air fuel ratio feedback correction coefficient at lean→rich inversion. Then at step S506 is calculated a deviation Δγ equal to air fuel ratio feedback correction coefficient average γave minus a reference value of "1".

Then at step S507 the current air fuel ratio learning value Lγ has a predetermined proportion G of deviation Δγ added thereto to calculate a new air fuel ratio learning value Lγ:

$$L\gamma = L\gamma + \Delta\gamma \times G,$$

wherein G represents a learning gain greater than zero and smaller than one.

The procedure then proceeds with step S508 to increment a learning frequency counter by one to calculate a learning frequency count value "n". The procedure further proceeds with step S509 to determine whether the learning frequency count value "n" is at least a predetermined frequency (for example of 30 times). If learning frequency count value "n" exceeds the predetermined frequency (YES at S509) the procedure proceeds with step S510 to update the air fuel ratio learning value. More specifically, the air fuel ratio learning value "Lγ" calculated at step S507 is presented as an air fuel ratio reflection value reflecting a result of learning. Then at step S511 an air fuel ratio learning completion flag F is set ON (=1). If the predetermined frequency is not exceeded, i.e., for "NO", a decision that the learning precision is insufficient is made and the procedure proceeds with step S512 to prohibit the air fuel ratio learning value from being updated, and at step S513 flag F is set OFF (=0).

Figure 3:
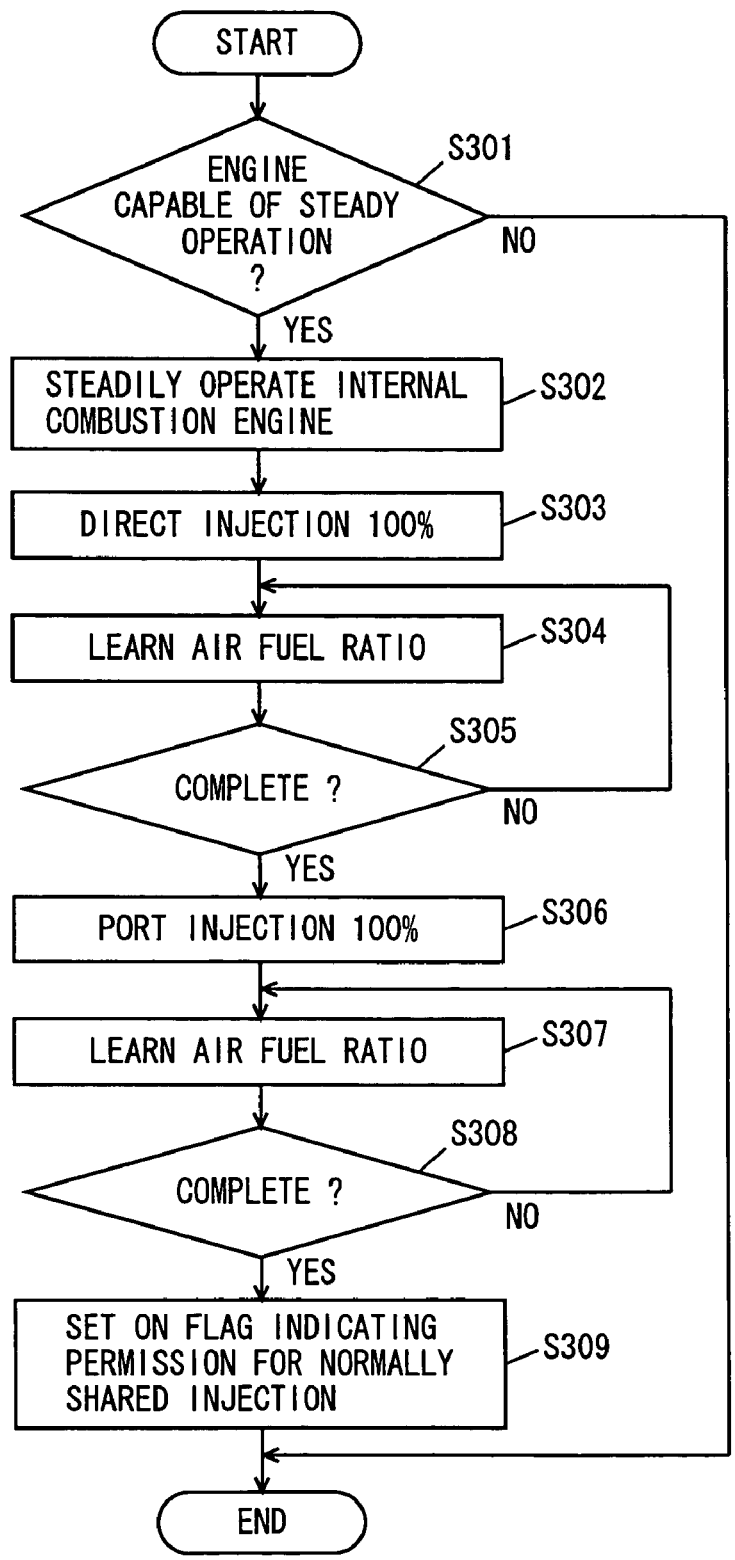
FIG. 3 is a flow chart illustrating one example of a routine for control in an embodiment of the present invention.

Thus, whether controlling air fuel ratio learning including learning the characteristic of injector 111 for in-cylinder injection or injector 112 for in-intake air path injection in the FIG. 3 flow chart at step S305 or S308 has completed or not can be determined from whether flag F is set ON or OFF.

After air fuel ratio learning control has completed for both injector 11 for in-cylinder injection and injector 112 for in-intake air path injection, the procedure goes through the FIG. 3 flow chart to step S309 to set ON a flag indicating permission for injection at a normal share ratio and completes the routine. Once this permission flag has been set ON, injector 111 for in-cylinder injection and injector 112 for in-intake air path injection can both inject fuel at a predetermined share ratio depending for example on a driving condition for operation.

Thus, in the present embodiment, air fuel ratio learning is controlled with engine 100 injecting fuel in an amount that does not vary, or in steady operation state, and hence accurately and rapidly. Furthermore, air fuel ratio learning can be controlled for any one of injectors for in-cylinder injection and in-intake air path injection, respectively, one at a time. Thus, air fuel ratio learning can be controlled for each of both injectors early and accurately.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In a hybrid vehicle driven by a dual injection internal combustion engine including an injector for in-cylinder injection and an injector for in-intake air path injection, and assistive dynamic, a method of controlling learning of an air fuel ratio of said dual injection internal combustion engine in said hybrid vehicle, to control learning of said internal combustion engine's air fuel ratio learning value the method comprising the steps of:

steadily operating said internal combustion engine and causing any one of said injectors to inject fuel while controlling learning of said air fuel ratio; and after controlling said learning has completed, causing only the other of said injectors to inject the fuel while controlling learning of air fuel ratio.

2. Method according to claim 1, wherein after controlling learning of said air fuel ratio has completed for both of said injectors said injectors are both permitted to inject the fuel for dual injection.

* * * * *